United States Patent Office.

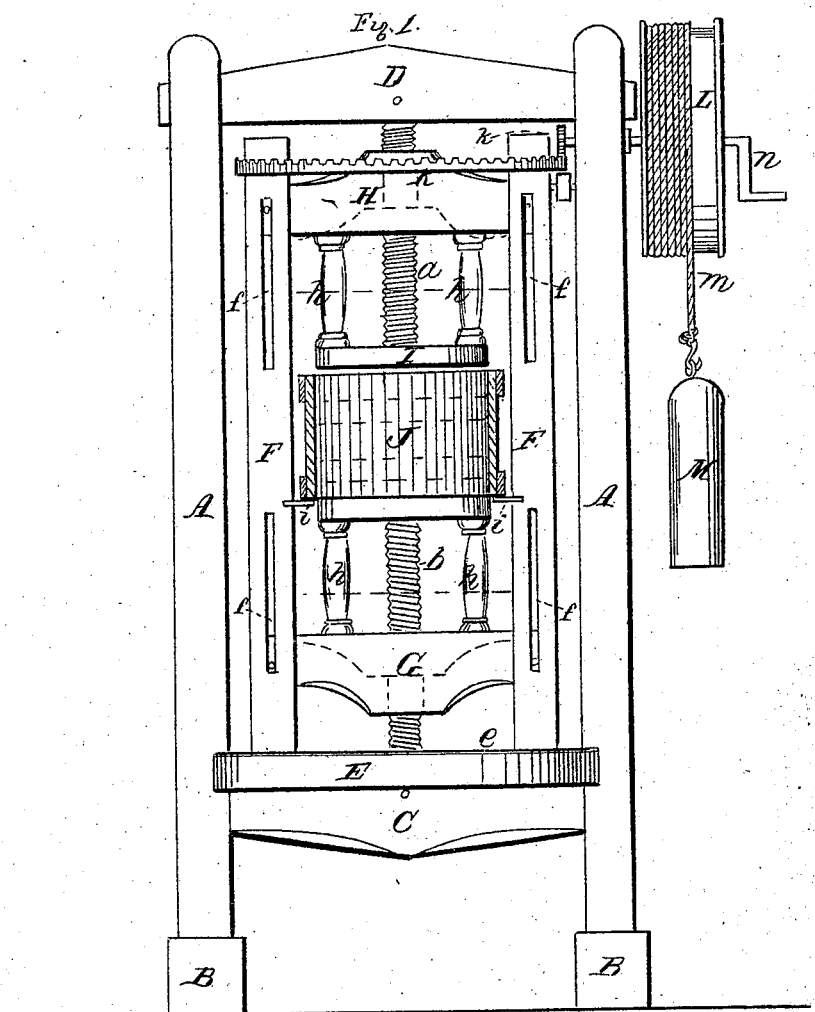

SAMUEL B. McCULLOUGH, OF ROCK SPRINGS, MARYLAND, AND JOHN R. WEST, OF LANCASTER COUNTY, PENNSYLVANIA; SAID WEST ASSIGNS TO SAID McCULLOUGH.

*Letters Patent No. 92,201, dated July 6, 1869.*

IMPROVED CHEESE-PRESS.

The Schedule referred to in these Letters Patent and making part of the same.

*To all whom it may concern:*

Be it known that we, SAMUEL B. MCCULLOUGH, of Rock Springs, in the county of Cecil, and State of Maryland, and JOHN R. WEST, of Lancaster county, in the State of Pennsylvania, have invented certain new and useful Improvements in Cheese-Presses; and the following is a full, clear, and exact description of the same, reference being had to the accompanying drawings, making a part of this specification, in which—

Figure 1 represents an upright or vertical section of the press.

Figure 2 shows a plan or top view of the same.

The object of our invention is to get a more uniform and equal pressure on both the top and bottom of cheese; and It consists in the construction, arrangement, and combination of mechanism hereinafter described.

We make the frame of suitable timber, of any required size or dimensions, with two upright posts, A A, supported on base-blocks, B B. At a suitable height from the bottom, is framed in a strong cross-timber, C; and also near the top of the posts A A, a similar cross-timber, D, in the centre of which timbers, C and D, are fitted, and permanently secured, right and left screws, *a b*, which point towards each other, and extend about one-third of the distance, each, of the space between the frame-timbers C and D.

On the lower timber C is secured a circular table, E, with an elevated edge or rim, *e e*, to receive and conduct off any whey or drippings that may be expressed from the cheese.

Above, and resting on the table E, are two vertical posts, F F, they having long slits or mortises *f f*, near both ends, into which are strong cross-pieces, G and H, fitted, so as to slide easily in the mortises *f f*, they being provided with or forming the boxes in which the right and left screws *a b* operate. To the upper side of the piece G, and the under side of the piece H, are attached supports or pillars *h h*, to which the followers I I are secured, they being of such size and shape as to fit into the hoop J, in which the cheese-curd is placed to be pressed; there being projections or ledges, *i i*, on the inside of the vertical posts F F, on which the rim of the hoop J rests, while the followers I I enter the hoop simultaneously from the bottom and top, and produce an equal amount of pressure on both, as the vertical frame rotates within the stationary frame, by which means the pressure is produced.

Near the top, or at any convenient place on the vertical posts F F, may be placed a gear-wheel or rim, K, into which a cog-wheel or pinion, *k*, operates to turn the frame in which the cheese is placed, the right and left screws *a* and *b* forming the centre, and shafts to turn on.

To the shaft of the pinion *k*, which extends through one of the upright posts A, may be secured a pulley or drum, L, of any desired size, over which a rope, *m*, may be wound, and so attached that a weight, M, may be hitched on, and a continuous pressure be kept up by the slow rotating of the vertical frame.

There may also be a crank, *n*, on the pinion-shaft, or a crank-pin or handle in the face of the drum or pulley L, by which means the frame containing the cheese and followers I I, may be turned in either direction to run the followers up or down.

The leverage from a large-sized drum or pulley, connected to the shaft, on which a small-sized pinion works in the large-size cog-wheel on the vertical frame, multiplies power to such an extent that it requires but a small weight to press a cheese sufficiently after the followers are brought to bear firmly on the curd in the hoop, by turning the vertical frame by hand.

A very good and efficient cheese-press may be made by dispensing with the gearing-pulley and weight, as above described, and have a cord or rope drawn from a horizontal rim on the vertical frame, in the place of the cog-wheel, and over a pulley or sheave in the post, with a weight attached on the outside.

And a still more simple press may be constructed by dispensing with all the mechanism to turn the vertical frame by gravity or other power, to work it automatically, but when the cheese is in, and being pressed, occasionally take hold of the frame and give it a turn or two, as it may bear, while the particles of the cheese are being compacted together.

It is well known to cheese-makers, that the top or side of a cheese on which the follower bears, is pressed the hardest. The friction of the strainer or cloth in which the curd is placed in the hoop, prevents the pressure from being equal on both top and bottom.

It will readily be seen by our construction of the press, with two followers, working exactly alike, and at the same time on both sides of the cheese, the defect is entirely remedied.

Having thus fully described our invention,

What we claim as new, and desire to secure by Letters Patent, is—

The arrangement of the cog-gear wheel K, pinion *k*, drum L, cord or rope *m*, and weight M, when combined with the rotating frame F, whose centre is a right and left-hand screw, all constructed to operate in the manner herein set forth and shown.

In testimony whereof, we hereunto subscribe our names, in the presence of—

SAMUEL B. McCULLOUGH.
JOHN R. WEST.

Witnesses:
J. N. FOSH,
A. C. JENKINS.